Dec. 30, 1930.   J. M. TAYLOR ET AL   1,787,404
PROCESS OF MANUFACTURING GUM BONDED LAMINATED BODIES
Filed July 9, 1926
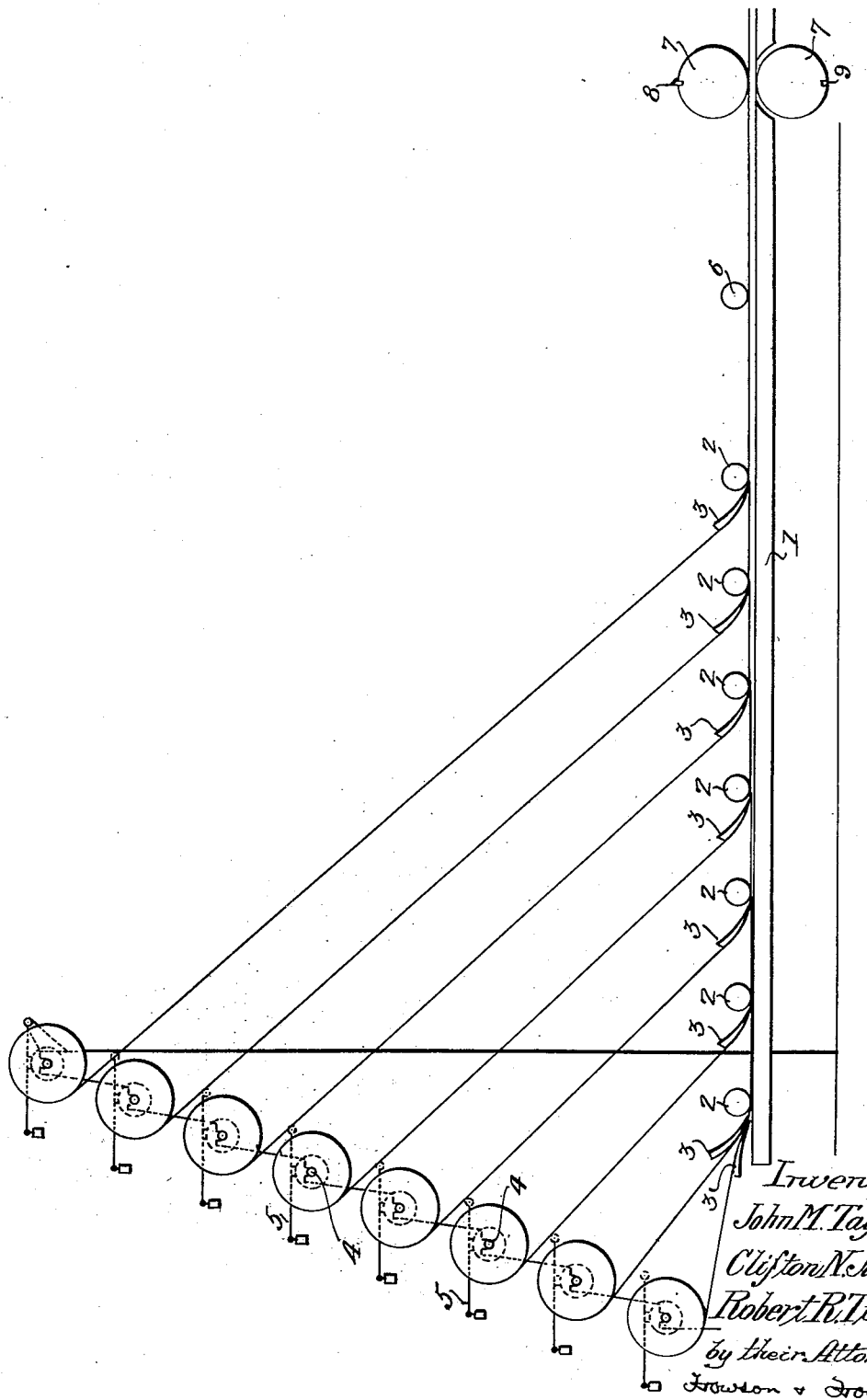

Patented Dec. 30, 1930

1,787,404

UNITED STATES PATENT OFFICE

JOHN M. TAYLOR, OF BRIDGEPORT, CLIFTON N. JACOBS, OF NORRISTOWN, AND ROBERT R. TITUS, OF VILLANOVA, PENNSYLVANIA, ASSIGNORS, BY MESNE ASSIGNMENTS, TO CONTINENTAL-DIAMOND FIBRE COMPANY, OF NEWARK, DELAWARE, A CORPORATION OF DELAWARE

PROCESS OF MANUFACTURING GUM-BONDED LAMINATED BODIES

Application filed July 9, 1926. Serial No. 121,428.

This invention relates to improvements in processes of manufacturing laminated bodies or plates of material bonded by synthetic resin in its final hardened condition.

The principal object of the invention is to provide a novel process of manufacturing laminated sheets or plates of this material which shall produce a more uniform product than hitherto has been obtainable commercially, and shall also materially facilitate manufacture and increase production.

Prior to our invention it has been customary to impregnate the sheets or papers forming the laminations with a synthetic resin in its soluble condition, and after drying the sheets to assemble them in superimposed relation and apply heat and pressure sufficient to convert the gum to its final hardened state. In this process it has been necessary to limit production to comparatively small sheets or plates, and as a consequence the product as a whole has lacked uniformity and production has been limited.

We have discovered that the gum-bonded laminated sheets or plates may be manufactured in continuous operation from extended sheets or rolls of the paper or fabric, constituting the laminations, and that by this process a superior product may be formed, generally more uniform than the product as previously manufactured, and that in addition to this improvement in the end product, the process of manufacture is materially facilitated and production increased.

In the attached drawing, we have illustrated diagrammatically mechanism for manufacturing the product in accordance with the present invention.

With reference to the drawing, it will be noted that we employ a table 1 which may be heated to the desired temperature by means of steam, electricity, gas or other heating medium. Mounted for rotation above this table is a plurality of rolls 2 which may be of the same width as the table and which preferably are adjustable vertically with respect to the table to vary the distance between the two surfaces. These rolls also are heated by any suitable means to a desired temperature, and the rolls are driven conjointly or individually by suitable driving mechanism (not shown).

Mounted above the table in advance of each of the rolls is one or more guide plates 3, and means is provided for heating these plates to the desired degree. As to the heating means employed, there is a wide variety of choice, and since methods of heating will be obvious, no particular form is illustrated.

Adjacent one end of the table is a suitable rack for rotatably mounting a plurality of rolls 4 on which may be wound the sheet material, such as paper or fabric, from which the laminated body is to be built up. As clearly illustrated, the sheets are fed from the rolls under the respective rollers 2 in such manner that the sheets are arranged in superimposed position one above the other and are so passed over the heated tables and under the rolls. In order to prevent too free movement of the material from the rolls, frictional resistance may be placed upon the latter, as by means of weighted arms 5, which tend to prevent free rotation of the rollers.

Prior to the winding of the material upon the rolls 4, it is coated by any suitable means and preferably on one side only with a synthetic resin in its soluble and fusible form, and thereafter dried. When, therefore, the sheets are fed over the guide plates and between the rolls and table, the heat is sufficient to flow the gum and the combined heat and pressure sufficient to bond the sheets together into a laminated body. The machine may be arranged so that sheets come from it with the resin fully polymerized, or they may be cut off after bonding and treatment concluded in a suitable dry house. In addition to the rolls 2, we may add additional rolls 6 of any desired number which also may be heated and which may apply further pressure to the laminated body. There is to be no limitation in the number and arrangement of heating and pressure rolls.

As further facilitating manufacture and to divide the continuous laminated body into a plurality of suitably sized sheets or plates prior to the final setting of the gum, we may provide suitable shearing means, such for example as the coacting pairs of rolls 7 having, one, a shearing projection 8, and the other a corresponding groove 9, which periodically act upon the moving sheet body to sever the latter into sections of suitable length. It will be noted that in the present instance in passing to the rolls 2, heat is applied to the coated paper or fabric sheets through the plates 3 which are so arranged that the sheets pass in close contact over the heated surfaces immediately before passing under the rolls.

The process provides a materially improved method of manufacturing laminated bodies of the stated character, in that, as previously stated, practical uniformity is obtained by reason of the exactly similar conditions under which all parts of the laminated body are brought together. It is further believed that a superior action is obtained through the use of rollers which tend to distribute the gum with greater uniformity than in the ordinary platen press. It will be clear that this method of manufacturing will result in a materially increased production by reason of the continuous character of the operations and the fact that comparatively large quantities of the final product may be produced in a continuous operation and without interruption or necessity of handling by the operators.

We claim:

1. A method of producing laminated gum-bonded bodies consisting of applying to a plurality of strips a synthetic resin in its soluble stage, drying the strips, superimposing the strips in successive order one upon the others, heating each strip prior to its application to the previously assembled strips to melt the resin and immediately thereafter rolling each individual strip into contact with the assemblage to insure complete adhesion of the applied strip thereto.

2. A method of producing laminated gum-bonded bodies consisting of applying to a plurality of strips a synthetic resin in its soluble stage, drying the strips, superimposing the strips in successive order one upon the others, heating each strip prior to its application to the previously assembled strips to melt the resin, rolling each individual strip into contact with the assemblage while the resin remains in the melted state to insure complete adhesion of the applied strip thereto, and finally heating and simultaneously rolling the assemblage under pressure to form a completely bonded laminated body.

JOHN M. TAYLOR.
CLIFTON N. JACOBS.
ROBERT R. TITUS.